United States Patent
Li

(10) Patent No.: US 8,044,952 B2
(45) Date of Patent: Oct. 25, 2011

(54) METHOD FOR SUPPORTING INTUITIVE VIEW SPECIFICATION IN THE FREE-VIEWPOINT TELEVISION APPLICATION

(75) Inventor: Baoxin Li, Chandler, AZ (US)

(73) Assignee: Sharp Laboratories of America, Inc., Camas, WA (US)

( * ) Notice: Subject to any disclaimer, the term of this patent is extended or adjusted under 35 U.S.C. 154(b) by 1054 days.

(21) Appl. No.: 11/973,129

(22) Filed: Oct. 5, 2007

(65) Prior Publication Data

US 2008/0174594 A1 Jul. 24, 2008

Related U.S. Application Data

(60) Provisional application No. 60/881,917, filed on Jan. 22, 2007.

(51) Int. Cl.
*G06T 15/00* (2006.01)

(52) U.S. Cl. .......................................... 345/419; 345/427

(58) Field of Classification Search .................. None
See application file for complete search history.

(56) References Cited

U.S. PATENT DOCUMENTS

| 7,085,409 B2 * | 8/2006 | Sawhney et al. ............. 382/154 |
| 2004/0222987 A1 * | 11/2004 | Chang et al. .................. 345/419 |

OTHER PUBLICATIONS

R. Kadobayashi and K. Tanaka, "3D Viewpoint-based Photo Search and Information Browsing", Aug. 19, 2005, ACM, Proceedings of the 28th annual international ACM SIGIR conference on Research and development in information retreival, pp. 621-22.*

N. Snavely, S. M. Seitz, and R. Szeliski, "Photo Tourism: Exploring Photo Collections in 3D", Jul. 2006, ACM, ACM Transactions on Graphics (TOG)—Proceedings of ACM SIGGRAPH 2006, vol. 25 Issue 3.*

R. Koch, M. Pollefeys, and L. Van Gool, "Multi Viewpoint Stereo from Uncalibrated Video Sequences", Jun. 6, 1998, Springer-Verlag, ECCV '98 Proceedings of the 5th European Conference on Computer Vision, vol. 1.*

Wenfeng Li, Jin Zhou, Baoxin Li, M. Ibhrahim Sezan, "Virtual View Specification and Synthesis in Free Viewpoint Television Application", Jun. 16, 2006, IEEE, Proceedings of the Third International Symposium on 3D Data Processing, Visualization, and Transmission.*

* cited by examiner

*Primary Examiner* — Ulka Chauhan
*Assistant Examiner* — Robert Bader
(74) *Attorney, Agent, or Firm* — Chernoff, Vilhauer McClung & Stenzel LLP

(57) ABSTRACT

A method of selecting first and second basis views from a group of at least three provided views where the first and second basis views are used in synthesizing a third virtual view. The group of provided views are spatially offset from one another in at least one dimension.

7 Claims, 2 Drawing Sheets

METHOD FOR SUPPORTING INTUITIVE VIEW SPECIFICATION IN THE FREE-VIEWPOINT TELEVISION APPLICATION

CROSS-REFERENCE TO RELATED APPLICATIONS

This application claims the benefit of provisional application 60/881,917, filed 22 Jan. 2007 and entitled Method for Supporting Intuitive View Specification In The Free Viewpoint Television Application, the entire disclosure of which is hereby incorporated by reference.

This application is related to copending U.S. patent application Ser. No. 11/462,327, filed 3 Aug. 2006 and entitled Virtual View Specification and Synthesis in Free Viewpoint (the '327 application), the entire disclosure of which is hereby incorporated by reference.

BACKGROUND OF THE INVENTION

The present system relates to implementing Free-viewpoint Television (FTV) with minor revision to typical television (TV) infrastructure and related viewer experiences. In addition to home entertainment, FTV can be used in other environments, such as gaming and education.

When viewing typical TV, the viewpoint is predetermined during the production of the particular program being watched by the placement of an acquisition camera. Unlike typical TV, FTV provides the viewer the freedom of choosing his own viewpoint by supplying the viewer's television set, or other display device, with multiple video streams captured by a set of cameras, each depicting a different view of a single scene, and by using the provided 'real' views to create a continuum of 'virtual' views, as described in detail in the '327 application.

However, the multiple video streams of a single scene may not contain explicit information about their spatial positioning relative to one another, so it is desirable for FTV to determine the relative spatial positioning of the video streams in order to select which video streams to use as the basis in creating the virtual view. Thus, the spatial positioning relationships are extrapolated from the data that is contained in the video streams. A variety of virtual view specification techniques utilize existing, image-based rendering techniques. For example, in a fully calibrated system where the relative spatial relationships between all the video streams are known the virtual view determination may be done through geometry. An alternative technique uses a viewer's manual selection of a variety of points, including the projection of the virtual camera center. Another technique determines the virtual viewpoint using a rotation matrix and a translation vector with respect to a known camera. However, these approaches require a fully calibrated system with known camera positioning or calibration input from a viewer.

The '327 application describes a technique for specifying a virtual view between any two viewer-chosen real basis views in an uncalibrated system. This allows virtual viewpoint specification using only a single user specified parameter, thereby permitting a virtual view to be defined by indicating a one dimensional directional shift, e.g. to the left, to the right, up, or down, from a current view. One limitation of the above two view based specification is the requirement for the viewer to choose the two basis views. This selection requirement may be non-intuitive for the viewer and tends to disrupt the TV viewing experience. For example, every time the viewer begins viewing a new scene it may be necessary to first display the available basis views for that scene and prompt the viewer to select the initial basis views. Thus a more 'user friendly' technique for selecting the basis views is desirable.

BRIEF DESCRIPTION OF THE SEVERAL DRAWINGS

DETAILED DESCRIPTION OF PREFERRED EMBODIMENTS

In a FTV application at a given point in time the viewer sees the current view, just as in a typical TV system. Unlike typical TV, the viewer may selectively "shift away" from the current view. The viewer should experience the viewpoint shift in a relatively seamless manner. From the viewer's perspective, the viewpoint shift may appear as though the acquisition camera recording the current view physically shifted in the desired direction. Although multiple real views may be provided, the number of real views may be lower than the number of potential virtual views. Thus, whenever the user pushes an arrow button on a remote control (or otherwise indicates by some manner) to shift the viewpoint, the new view may be a virtual one and this requires a virtual view synthesis. Without sufficient calibration, it is not feasible to use a distance or an angle relative to the current view to specify the new view. However, determining or using a relative spatial relationship among the basis views permits using the single-parameter-based technique described in the '327 application to specify the virtual view.

Figure 1:
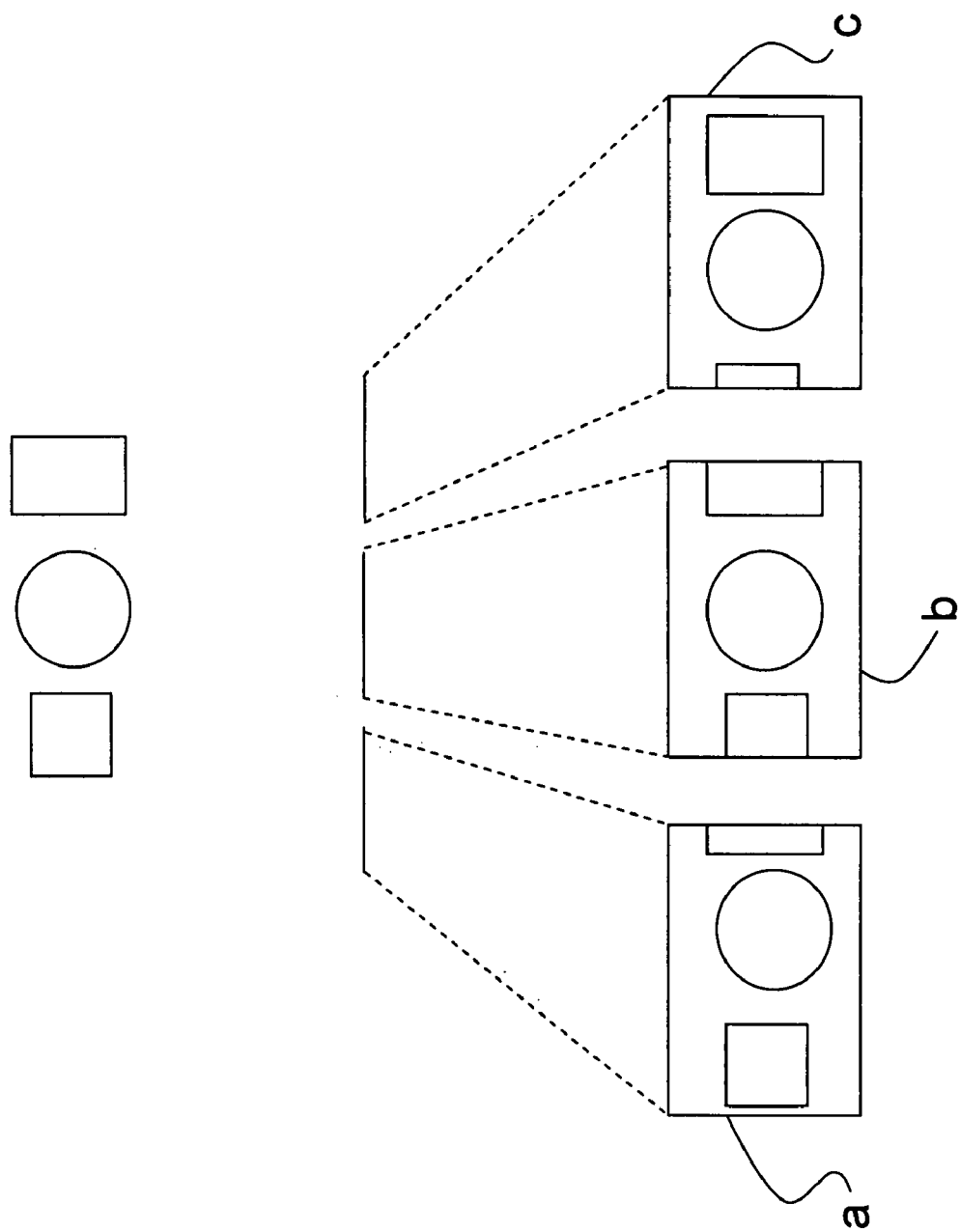
FIG. 1 illustrates an exemplary camera layout, demonstrating the difference in viewpoint between cameras.

Referring to FIG. 1, if the current viewpoint is real view b, and it is known that the nearest real view to the relative right of view b is view c, then when the viewer pushes a right-arrow button, the technique described in the '327 application may be used to parameterize a virtual view b' based on view b (left) and view c (right). For purposes of illustration in the foregoing description only the horizontal relationship between the views is described. The vertical relationship is done in a similar fashion. Once the two appropriate basis views are determined, then the technique described in the '327 application is applicable. However, the appropriate basis views are first selected without the assistance of the viewer.

In a preferred embodiment of the technique one of the basis views is defined by the current view ($view_{cur}$) on display at the time the viewer indicates a desire to shift away from that view. If $view_{cur}$ is a real view, then $view_{cur}$ will itself be used as a basis view. If $view_{cur}$ is a synthesized virtual view then one of the basis views used to synthesize $view_{cur}$ is known and this view may be used as one of the basis views for the new virtual view. Since there may be multiple views to either side of $view_{cur}$, the preferred technique identifies the one that is closest. For example, again referring to FIG. 1, if $view_{cur}$ is real view b and the viewer indicates a desire to shift the viewpoint to the right, then view b should be one of the two basis views. What should be determined is whether view a or view c is preferably the second of the two basis views.

A preferred embodiment of the present technique utilizes two techniques for making a determination of which view should be used, each using a different assumption. The first technique estimates the pair-wise left-right relations of two images. The second technique estimates a closeness measure among multiple views. Although the two techniques share some common elements, including the use of conventional feature point detection and correspondence techniques, the estimation of a fundamental matrix, and comparable computational costs, they are fundamentally different as they rely on different assumptions.

The main assumption of the first technique of pair-wise left-right relations is that a camera's intrinsic matrix can be estimated by a relatively simple and conventional technique, described below. This, in turn requires that the acquisition process be typical, e.g., without asymmetric cropping of the images, uses a known or reasonable range of zoom factors, etc. If the assumption is satisfied, this technique is relatively straightforward to use because it directly provides the necessary translation vector between two views. The main assumption of the second technique of the closeness factor is that a feature correspondence algorithm will be able to detect more background feature points than foreground ones. Scenes with relatively small foreground objects on a relatively far background, for example two people standing on a street, naturally satisfy this assumption. On the other hand, scenes with a close shot of an object, for example a close shot of a bouquet, violate this assumption.

In the first preferred technique, the fundamental matrix F of the known basis view and one of the potential basis views is estimated. This may preferably be done using known feature correspondence techniques. For example, the random sample consensus (RANSAC) algorithm could be used in conjunction with a Harris Corner Detector to estimate the fundamental matrix. A single intrinsic matrix K for the cameras may also be estimated. This may preferably be done by assuming the principal points are located at the center of the image and setting the focal length f as equal to the image width w multiplied by the zoom factor x (which is set to 1 if unknown). This initial estimate of K may be further refined by a conventional approach based on the reprojection errors in the feature points. Thus:

$$K = \begin{bmatrix} f & 0 & p_x \\ 0 & f & p_y \\ 0 & 0 & 1 \end{bmatrix}, \quad \begin{aligned} p_x &= w/2 \\ p_y &= h/2 \end{aligned}$$

The essential matrix E of the cameras may now be computed using the estimated fundamental matrix F and intrinsic matrix K:

$$E = K^{-1} F K$$

Applying single value decomposition techniques to the essential matrix E yields the rotation and translation matrices for the two views. There are 6 parameters recovered from this process, 3 for the rotation matrix and 3 for the translation matrix, represented by $R_x$, $R_y$, $R_z$, $t_x$, $t_y$, and $t_z$. The relative left-right relationship of the two views can be determined by examining $t_x$, if $t_x > 0$ then view 1 is on the right; otherwise, it is on the left. This technique is advantageous because the value of $t_x$ can be used to further sort multiple views. For example, if view a and view b are both on the left of view c, the magnitude of $t_x$ will determine which one is closer to view c.

However, this technique works well only as long as the estimates for the fundamental and intrinsic matrices are accurate. The accuracy of the estimation is dependent on the strength of the feature correspondence algorithm. Practically speaking, using the image center to approximate the principal point of a camera is a good estimate, unless, for instance, the image is cropped significantly and largely asymmetrical. Also, because the distance between the two cameras under consideration may be reasonably large, small errors in the principal points will not significantly affect the estimated translation matrix.

The second preferred technique relies on computing the average and median disparity values (defined as the average of the maximum and the minimum disparities). Although a fully calibrated system cannot be assumed, it is helpful to describe how the view disparities can be used to determine pair-wise left-right relationship of two views in such a system, such as a standard stereo setup. By definition, in a standard stereo setup all disparities between the views are horizontal and the magnitude of the disparity for a given point is a function of the point's depth in the field of view, with the magnitude approaching zero as the depth approaches infinity.

Figure 2:
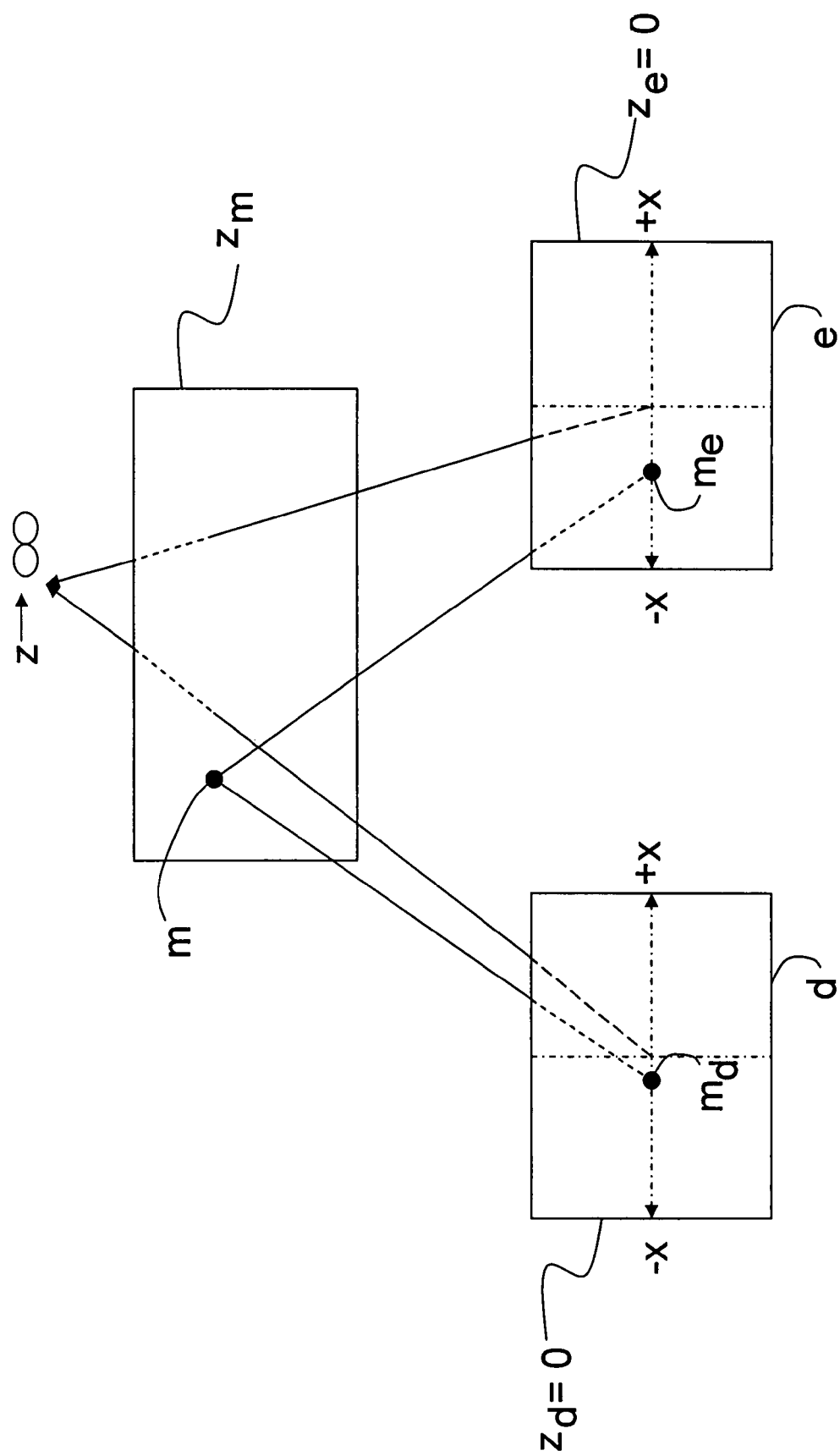
FIG. 2 illustrates the geometrical relationship of two cameras arranged in a standard stereo setup.

FIG. 2 illustrates two views, d and e, positioned in a standard stereo setup. For a given point m in the scene each camera views a respective matching point $m_d$, $m_e$ at respective coordinates $x_{d,m}$, $y_{d,m}$ and $x_{e,m}$, $y_{e,m}$. Because of the standard stereo setup, $y_{d,m}$ will equal $y_{e,m}$ but there will be a horizontal disparity: $d_m = x_{e,m} - x_{d,m}$. Because view d is on the left of view e, the disparity for all points in these two views will be greater than zero. This is true regardless of the location of the point m in the field of view. Conversely, if view d were on the right of view e, the disparity would be less than zero.

Yet a practical embodiment should account for all the available views being in general positions, not a standard stereo setup. It is feasible, given some assumptions, to use known techniques to rectify two uncalibrated views to create an approximation of a fully calibrated standard stereo setup.

A preferred technique for selecting an appropriate basis view using image rectification begins, as did the technique described above, with estimating the fundamental matrix F of the two images. Using the fundamental matrix F, the two images may be rectified such that all epipolar lines become horizontal and aligned. For a description of such a rectification technique, see J. Zhou and B. Li, "Image Rectification for Stereoscopic Visualization Without 3D Glasses," International Conference on Content-Based Image and Video Retrieval, 2006.

The feature points may then be transformed to the rectified image coordinate system and disparities for the feature points may be calculated. In the rectified image coordinate system, all disparities will be one dimensional (e.g. horizontal, with zero vertical disparity). After rectification however, the horizontal distance between the two image planes is still unknown. This is equivalent to adding an unknown constant to all the image disparities. This consequently introduces some ambiguity in determining relative camera position because, for example, the addition of the constant may cause there to be both positive and negative disparities.

To resolve the ambiguity, the technique assumes more feature points were detected in the background than the foreground. Given a disparity set $D = \{d_i\}$, $i = 1, \ldots, n$, the average disparity is defined as $$Avg(D) = \frac{1}{n} \sum_{i=1}^{n} d_i$$

and the median disparity as $$Median(D) = \frac{Max(d_i) + Min(d_i)}{2}$$

If there are more background points than foreground points, it follows the average depth of those points is closer to the background and the average disparity will be closer to the minimum disparity than the maximum and, consequently, the average disparity will be less than the median disparity. This relationship is not influenced by the shifting of disparities due to the rectification ambiguity. Therefore, if the average disparity is less than the median disparity, then first image is on the left, otherwise it is on the right.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of selecting first and second basis views from a group of at least three provided views, said first and second basis views to be used in synthesizing a third virtual view, said group of provided views being spatially offset from one another in at least one dimension, and the method comprising:
    (a) receiving an input from a user indicating a desired direction of shift in said one dimension from a current view;
    (b) determining which view within said group of provided views is spatially closest to said current view relative to a direction opposite said desired direction of shift, selecting that view as said first basis view, and thereby creating a sub-group of at least two provided views, said sub-group being composed of the provided views not selected as said first basis view; and
    (c) determining automatically with a processor, and without manual input, which of said sub-group of provided views is spatially closest to the selected first basis view relative to said desired direction of shift by determining a directional relationship between pairs of said views using a comparison between an average disparity and a median disparity in a rectified image constructed from said pairs of said views; and
    (d) selecting the determined view that is spatially closest the first basis view as the second basis view.

2. The method of claim 1 wherein said input is selected by a user using a remote control.

3. The method of claim 1 wherein said selecting said spatially closest view is performed free from user input.

4. The method of claim 1 wherein said determining which of said views is based upon a pair-wise set of relations.

5. The method of claim 4 wherein said pair-wise set of relations is left-right.

6. The method of claim 4 wherein said pair-wise set of relations is based upon feature correspondence.

7. The method of claim 1 including the step of using a translation value received from an essential matrix, said essential matrix computed as a function of a fundamental matrix of said first basis view and an intrinsic matrix of all views.

* * * * *